(12) United States Patent  (10) Patent No.: US 9,886,217 B2
Tsuchiya  (45) Date of Patent: Feb. 6, 2018

(54) STORAGE SYSTEM USING A DISTRIBUTED PARTIAL HIERARCHICAL MAPPING

(71) Applicant: FUJITSU LIMITED, Kawasaki-shi, Kanagawa (JP)

(72) Inventor: Naoshi Tsuchiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 89 days.

(21) Appl. No.: 14/528,304

(22) Filed: Oct. 30, 2014

(65) Prior Publication Data

US 2015/0169229 A1  Jun. 18, 2015

(30) Foreign Application Priority Data

Dec. 12, 2013  (JP) ................................ 2013-257477

(51) Int. Cl.
*G06F 3/00*  (2006.01)
*G06F 3/06*  (2006.01)

(52) U.S. Cl.
CPC .............. *G06F 3/067* (2013.01); *G06F 3/061* (2013.01); *G06F 3/0649* (2013.01); *G06F 3/0608* (2013.01); *G06F 3/0665* (2013.01); *G06F 2003/0692* (2013.01)

(58) Field of Classification Search
CPC ...... G06F 3/0665; G06F 3/067; G06F 3/0689; G06F 2003/0692
USPC ......... 711/114, 117, 162, 146; 707/616, 641, 707/786, 829; 714/612, 602, 6.2, 6.22
See application file for complete search history.

(56) References Cited

U.S. PATENT DOCUMENTS 6,477,620 B1 * 11/2002 Bauman .............. G06F 12/0811 711/118
6,487,622 B1 * 11/2002 Coskrey, IV .......... H04L 49/90 710/240
6,496,944 B1 * 12/2002 Hsiao .................. G06F 11/1435 714/15

(Continued)

FOREIGN PATENT DOCUMENTS

JP  2003-345643  12/2003
JP  2005-115438  4/2005

(Continued)

OTHER PUBLICATIONS

Japanese Office Action dated Jun. 20, 2017 in related Japanese Application No. 2013-257477.

*Primary Examiner* — Reba I Elmore
(74) *Attorney, Agent, or Firm* — Staas & Halsey LLP

(57) ABSTRACT

A storage device includes a first storage unit, a second storage unit, a third storage unit, and a processor. The first storage unit is configured to store therein a part of a data group stored in a storage system. The second storage unit is configured to store therein partial hierarchical information which is a part of information on a hierarchical structure of the data group. The third storage unit is configured to store therein owner information including a data identifier in association with a device identifier. The data identifier identifies a specific data included in the data group. The specific data is related to the partial hierarchical information. The device identifier identifies a specific storage device. The specific device stores therein the specific data. The processor is configured to share management of the data group with other storage devices on basis of the partial hierarchical information and the owner information.

9 Claims, 14 Drawing Sheets

(56) References Cited

U.S. PATENT DOCUMENTS

| | | | | |
|---|---|---|---|---|
| 6,694,412 B2* | 2/2004 | Frank | | G06F 9/30003 |
| | | | | 711/153 |
| 7,299,351 B2* | 11/2007 | Huitema | | H04L 63/04 |
| | | | | 713/156 |
| 8,280,853 B1* | 10/2012 | Lai | | G06F 17/30073 |
| | | | | 707/651 |
| 8,600,953 B1* | 12/2013 | Gerber | | G06F 11/1458 |
| | | | | 707/687 |
| 8,655,848 B1* | 2/2014 | Leverett | | G06F 17/30088 |
| | | | | 707/660 |
| 8,782,363 B2* | 7/2014 | Shitomi | | G06F 3/061 |
| | | | | 711/162 |
| 9,251,081 B2* | 2/2016 | Chang | | G06F 12/0848 |
| 9,471,595 B1* | 10/2016 | Vempati | | G06F 17/30221 |
| 2002/0065810 A1* | 5/2002 | Bradley | | G06F 17/30179 |
| 2003/0220985 A1 | 11/2003 | Kawamoto et al. | | |
| 2004/0243625 A1* | 12/2004 | Iwatsu | | G06F 17/30286 |
| 2005/0080810 A1 | 4/2005 | Matsuura | | |
| 2005/0192918 A1* | 9/2005 | DeLorme | | G06F 17/30067 |
| 2006/0069665 A1 | 3/2006 | Yamakawa et al. | | |
| 2008/0155214 A1 | 6/2008 | Shitomi | | |
| 2008/0270461 A1* | 10/2008 | Gordon | | G06F 3/0608 |
| 2009/0271412 A1* | 10/2009 | Lacapra | | G06F 17/30206 |
| 2010/0191783 A1* | 7/2010 | Mason | | G06F 17/30088 |
| | | | | 707/822 |
| 2010/0293338 A1* | 11/2010 | Krishnaprasad | | G06F 12/0813 |
| | | | | 711/136 |
| 2011/0099174 A1* | 4/2011 | Chappell | | G06F 17/30911 |
| | | | | 707/741 |
| 2012/0075319 A1* | 3/2012 | Dally | | G06F 12/0284 |
| | | | | 345/537 |
| 2012/0239876 A1* | 9/2012 | Bish | | G06F 3/0611 |
| | | | | 711/111 |
| 2013/0013958 A1* | 1/2013 | Leggette | | H04L 65/4084 |
| | | | | 714/6.2 |
| 2013/0326147 A1* | 12/2013 | Steely, Jr. | | G06F 12/082 |
| | | | | 711/130 |
| 2014/0112339 A1* | 4/2014 | Safranek | | G06F 12/0831 |
| | | | | 370/389 |
| 2015/0052111 A1* | 2/2015 | Mason, Jr. | | G06F 17/30088 |
| | | | | 707/684 |
| 2015/0169229 A1* | 6/2015 | Tsuchiya | | G06F 3/0608 |
| | | | | 711/114 |

FOREIGN PATENT DOCUMENTS

| | | |
|---|---|---|
| JP | 2006-092322 | 4/2006 |
| JP | 2008-159027 | 7/2008 |

* cited by examiner

STORAGE SYSTEM USING A DISTRIBUTED PARTIAL HIERARCHICAL MAPPING

CROSS-REFERENCE TO RELATED APPLICATION

This application is based upon and claims the benefit of priority of the prior Japanese Patent Application No. 2013-257477, filed on Dec. 12, 2013, the entire contents of which are incorporated herein by reference.

FIELD

The embodiment discussed herein is related to a storage device and a storage system.

BACKGROUND

In conventional stand-alone storage devices, device models have respective performance limits. When the load of operations increases, or the capacity limit of a single device is reached, a user has had to upgrade his or her device to an upper-level model, or to distribute services to be provided among a plurality of individual devices.

However, upgrading or distributing of services among a plurality of devices impairs the user's convenience. Recently, with an increasing amount of capacity demanded for storage devices as a backdrop, a scale-out type storage system has been desired.

In scale-out storage area network (SAN) devices, blocks are units of access. In such a SAN device, it is easy to process the user's requests by using a plurality of storage devices. Therefore, scale-out type storage has gained relatively widespread use.

In contrast, in scale-out network attached storage (NAS) devices, a consistent namespace has to be maintained by a plurality of storage devices. Therefore, in such a NAS device, the user's requests are not processed in parallel by simply using a plurality of storage devices. In scale-out NAS devices, a file system with a single namespace has to be provided to the user. There are a plurality of implementation schemes in scale-out NAS devices in accordance with differences in the meta data management scheme of the file system.

FIG. 13 and FIG. 14 are diagrams for explaining conventional implementation schemes in a scale-out NAS device. FIG. 13 is a diagram for explaining implementation employing internal mounts of a plurality of volumes by using junctions. In FIG. 13, each of nodes 81 to 84 is a storage device, and includes independent redundant array of inexpensive disks (RAID) and a file system. The plurality of nodes 81 to 84 connected over a network constitute one storage system.

A to E denote storage areas called volumes, and the user's file is created in a volume. The node 81 includes the volumes A and D, the node 82 includes the volume C, the node 83 includes the volume E, and the node 84 includes the volume B.

In the storage system, each volume is mounted at a junction point. This enables the storage system to be seen as a single namespace from the user. The junction point as used here is a point at which, when volumes are connected in a hierarchy as illustrated in FIG. 13, a volume at a lower level is connected to a volume at an upper level. For example, the volume B has junction points at which the volume D and the volume E are connected below the volume B.

FIG. 14 is a diagram for explaining implementation using a single namespace container. In FIG. 14, nodes 91 to 94 are storage devices, which are connected over a network and constitute one storage system.

$D_1$ to $D_5$ denote storage areas called file containers, and the user's file is created in a file container. The node 91 includes the file containers $D_1$ and $D_4$, the node 92 includes the file container $D_3$, the node 93 includes the file container $D_5$, and the node 94 includes the file container $D_2$.

The node 94 also includes a namespace container NS. The namespace container NS stores the names of files in association with file containers containing the files, and manages file names of the entire storage system. For example, the namespace container NS stores the fact that the $file_1$ is included in the container $D_1$, the $file_2$ is included in the file container $D_4$, and the $file_3$ is included in the file container $D_3$.

Besides the two implementation schemes, there is a implementation scheme in which a storage system including a plurality of storage devices provides a single namespace and a single file container to stripe data across a plurality of storage devices.

Additionally, there is an example of related arts in which a plurality of file systems provided by separate NAS systems are integrated into a single "global" namespace, and the integrated namespace is provided to NAS clients.

There is another example of related arts in which restrictions are totally imposed on storage resources of a plurality of file systems in a network storage system where the plurality of file systems are virtualized as one file system to enable access to that file system.

Related techniques are disclosed in, for example, Japanese Laid-open Patent Publication No. 2008-159027 and Japanese Laid-open Patent Publication No. 2006-92322.

The implementation scheme employing internal mounts of a plurality of volumes by using junctions has an advantage in that the overhead involved in scaling out is small, because architecture before scale-out, almost exactly as it is, may be utilized, and a file is possessed and managed by a specific node in units of volumes. However, this implementation scheme has a problem in that files may be assigned to nodes only at a coarse granularity, that is, in units of volumes.

The implementation scheme using a single namespace container NS has an advantage in that files may be assigned to nodes in units of files, but a problem in that there is an overhead of making an inquiry to a namespace container NS about the storage node of a file.

SUMMARY

According to an aspect of the present invention, provided is a storage device of constituent storage devices included in a storage system. The storage device includes a first storage unit, a second storage unit, a third storage unit, and a processor. The first storage unit is configured to store therein a part of a data group stored in the storage system. The second storage unit is configured to store therein partial hierarchical information which is a part of information on a hierarchical structure of the data group. The third storage unit is configured to store therein owner information including a data identifier in association with a device identifier. The data identifier identifies a specific data included in the data group. The specific data is related to the partial hierarchical information. The device identifier identifies a specific device of the constituent storage devices. The specific device stores therein the specific data. The processor is configured to share management of the data group with other devices of the constituent storage devices on basis of the partial hierarchical information and the owner information.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, an embodiment of a storage device and a storage system will be described in detail with reference to the accompanying drawings. It is to be noted that this embodiment is not intended to limit the disclosed techniques.

Embodiment

Figure 1:
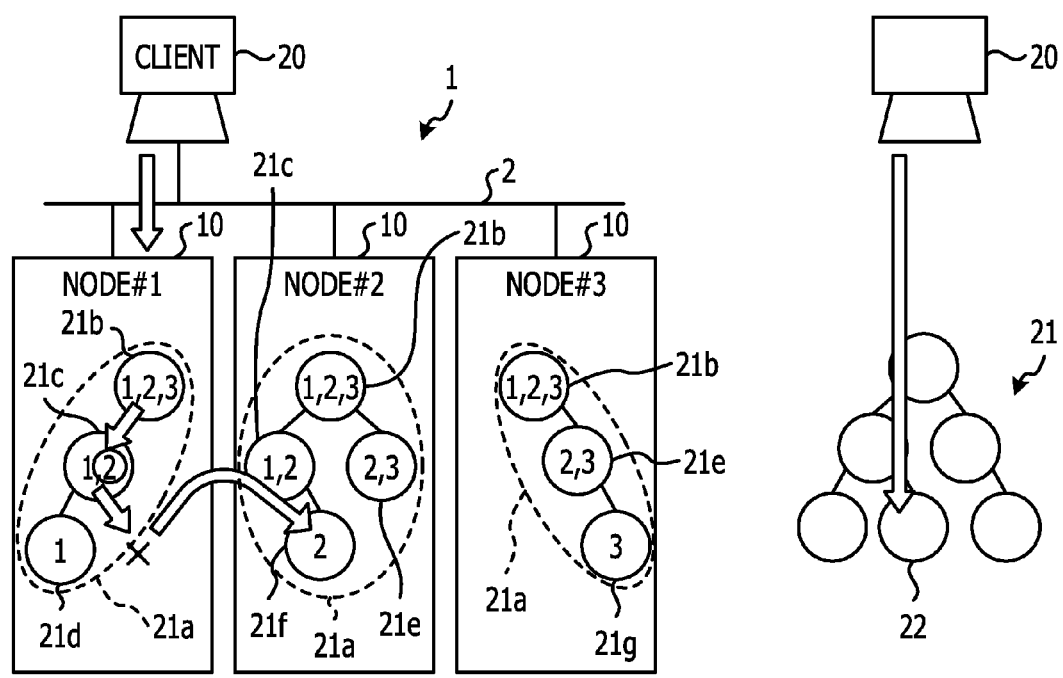
FIG. 1 is a diagram for explaining information owned by nodes according to an embodiment.

First, information owned by a node according to the embodiment will be described. FIG. 1 is a diagram for explaining information owned by nodes according to the embodiment. As illustrated in FIG. 1, a storage system 1 includes a plurality of nodes 10 connected over a protocol network 2 one another.

A node 10 is a storage device including a storage area in which files are stored. The protocol network 2 is a network for connecting the storage system 1 and a client 20 which is a terminal device used by a user to use the storage system 1. Note that although three nodes 10 (node#1, node#2, and node#3), and one client 20 are included here, the storage system 1 may include any numbers of nodes 10 and clients 20.

The entire storage system 1 provides one file system and a namespace. A namespace tree 21 is a tree indicating a configuration of directories and files included in a file system. In the namespace tree 21 illustrated in the drawings, circles indicate directories and files, and links indicate the parent-child relationship between directories or between a directory and a file.

Each node 10 stores information on a namespace branch 21a, which is part of the namespace tree 21, and shares and stores information on the namespace tree 21 in such a manner that when namespace branches 21a included in all the nodes 10 are gathered together, the namespace tree 21 is obtained.

In association with a directory or file in the namespace branch 21a, each node 10 stores a number identifying the node 10 that stores information on the directory or file. For example, in association with a root directory 21b, the node#1 stores "1", "2", and "3" as numbers of the nodes 10 that store information on the root directory 21b. In association with a directory 21c which is a child of the root directory 21b, the node#1 stores "1" and "2" as numbers of the nodes 10 that store information on the directory 21c. In association with a file 21d, which is a child of the directory 21c, the node#1 stores "1" as the number of the node 10 that stores information on the file 21d.

Similarly, the node#2 stores numbers of the nodes 10 that store information on the root directory 21b, and numbers of the nodes 10 that store information on the directory 21c and a directory 21e, which are children of the root directory 21b. The node#2 also stores the number of the node 10 that stores information on a file 21f, which is a child of the directory 21c.

Similarly, the node#3 stores numbers of the nodes 10 that store information on the root directory 21b, and numbers of the nodes 10 that store information on the directory 21e, which is a child of the root directory 21b. The node#3 also stores number of the node 10 that stores information on a file 21g, which is a child of the directory 21e.

Then, for example, a node 10 (hereinafter referred to as a "reception node 10" for simplicity) that has received a file access request from the client 20, traces information on the namespace branch 21a from the root to a location that matches a path of the file access request. If the reception node 10 owns a file specified by the file access request, the reception node 10 executes the file access request. If, however, the reception node 10 does not own that file, the reception node 10 transmits the file access request to the node 10 of another number associated with the final directory that matches the path of the file access request.

For example, in FIG. 1, when the node#1 receives an access request to access a file 22 in the namespace tree 21, the node#1 traces information on the namespace branch 21a from the root, and identifies the directory 21c, which matches the path of the access request. Here, it is found that the node#1 does not own information on the file 22, and it is also found that the node#2 owns information on the directory 21c. Accordingly, the node#1 sends the access request to the node#2.

In this way, the node 10 has information on the namespace branch 21a, which is part of the namespace tree 21. In association with a directory or file in the namespace branch 21a, the node 10 stores a number identifying the node 10 that stores information on the directory or file. If the node 10 does not own a target file of an access request, the node 10 transmits the access request to the node 10 of a number associated with the directory in the namespace branch 21a. Accordingly, even if the node 10 does not own a target file of an access request, the node 10 does not have to make an inquiry to a namespace container NS about the storage node of the file. This may reduce an overhead entailed in that inquiry.

Figure 2:
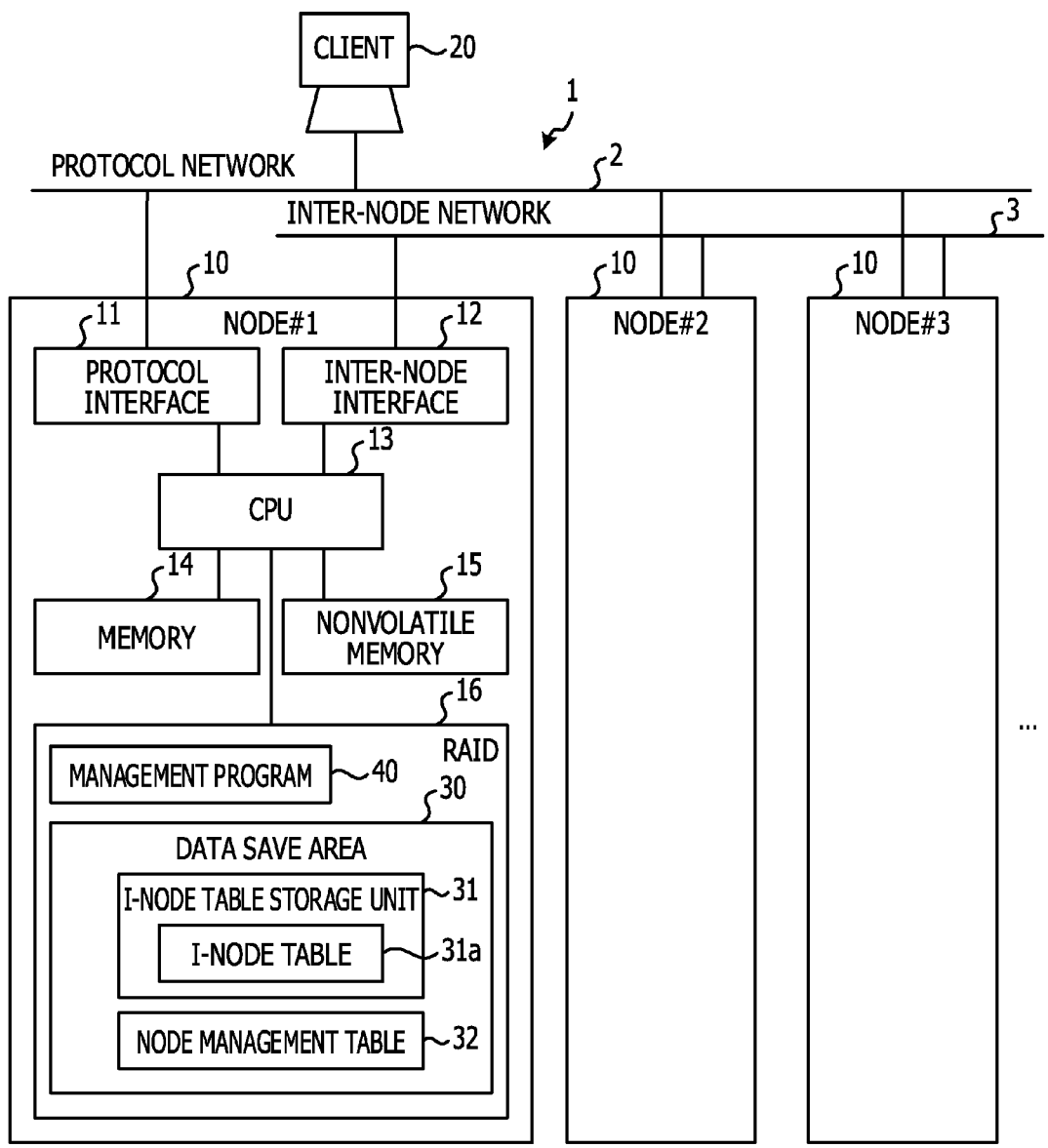
FIG. 2 is a diagram illustrating a configuration of a storage system according to the embodiment.

Next, the configuration of the storage system 1 according to the embodiment will be described. FIG. 2 is a diagram illustrating a configuration of the storage system 1 according to the embodiment. As illustrated in FIG. 2, in the storage system 1, a plurality of nodes 10 are connected with one another over an inter-node network 3 in addition to the protocol network 2. The inter-node network 3 is used for, for example, communication among the nodes 10 such as transfer of a user request and movement of files between the nodes 10.

Each node 10 includes a protocol interface 11, an inter-node interface 12, a central processing unit (CPU) 13, a memory 14, a non-volatile memory 15, and a RAID 16.

The protocol interface 11 is an interface for communication with the client 20 over the protocol network 2. The inter-node interface 12 is an interface for communication with other nodes 10 over the inter-node network 3.

The CPU 13 is a central processing unit that executes programs stored in the memory 14. The memory 14 is a random access memory (RAM) that stores programs, intermediate results of computations, data stored in the RAID 16, and so forth. The non-volatile memory 15 is a flash memory that saves data stored in the memory 14 when a failure occurs in the node 10.

The RAID 16 is a storage device that stores therein data, and includes a data save area 30. The RAID 16 also stores a management program 40 for managing data stored in the RAID 16. When loaded into the memory 14 and executed by the CPU 13, the management program 40 may give the CPU 13 a function as a management unit that manages data stored in the RAID 16.

The data save area 30 stores user data, and stores metadata used for management of user data in an i-node table storage unit 31, a node management table 32, and so forth.

The i-node table storage unit 31 is a storage unit that stores therein a plurality of i-node tables 31a. Each i-node table 31a stores therein information on direct child directories or files included in one directory.

Figure 3:
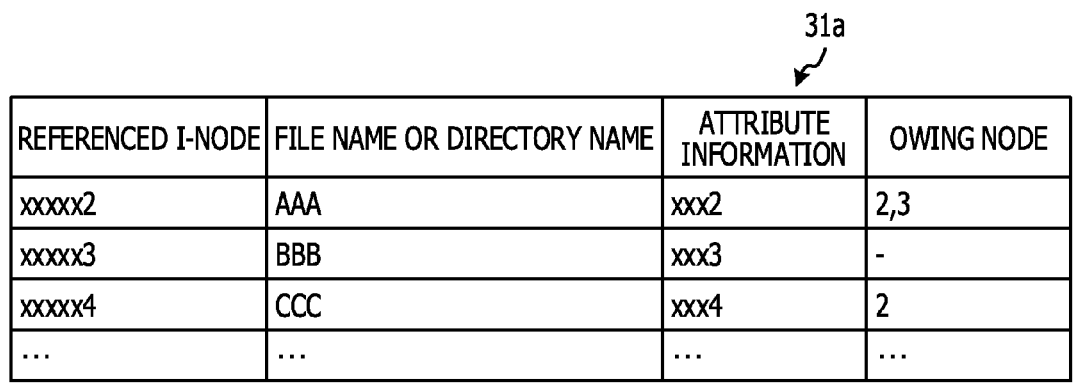
FIG. 3 depicts an example of an i-node table.

FIG. 3 depicts an example of an i-node table 31a. As illustrated in FIG. 3, the i-node table 31a stores, in each entry for a direct child directory or file, a referenced i-node, a file name or directory name, attribute information, and owing nodes.

The referenced i-node is information indicating a location (hereinafter referred to as a "storage location") where the i-node table 31a corresponding to the direct child directory is stored. The referenced i-node indicates hierarchical structure information of the namespace tree 21.

The file name or directory name is the name of a file when the direct child is a file, and is the name of a directory when the direct child is a directory. The attribute information is information on whether it is possible to write data, and the like. The owing node indicates the number of the node 10 that owns information on a directory or file, corresponding to the referenced i-node.

For example, assuming that "AAA" is a directory name, for the directory whose name is "AAA", the storage location of the corresponding i-node table is "xxxxx2", the attribute information is "xxx2", and the numbers of the nodes 10 that own information on the directory are "2" and "3".

In this way, the i-node table 31a stores the numbers of the nodes 10 that own information on a directory or file in association with the directory or file. Accordingly, when a node 10 does not own file information or directory information, the node 10 may identify another node 10 that owns the file information or directory information. This may reduce an overhead of making an inquiry to a namespace container NS about a transfer destination.

Figure 4:
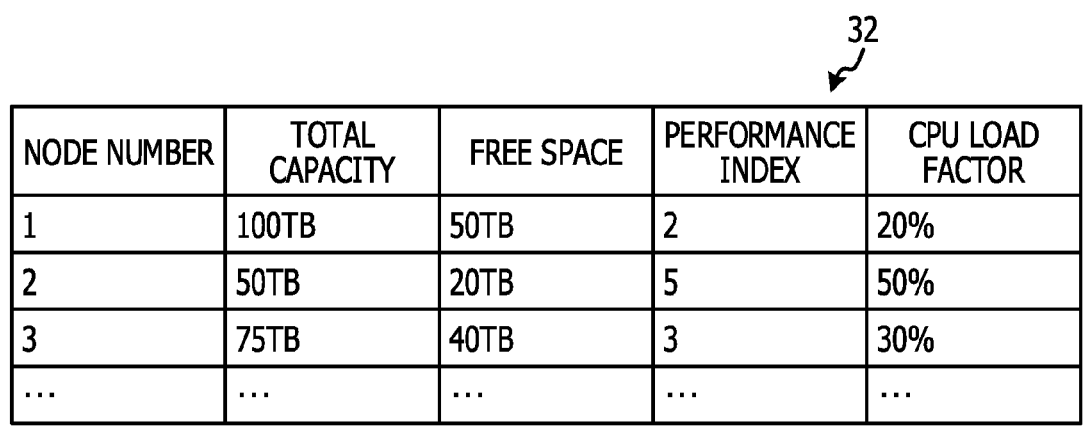
FIG. 4 depicts an example of a node management table.

The node management table 32 is a table that stores therein information on the nodes 10. FIG. 4 depicts an example of the node management table 32. As illustrated in FIG. 4, the node management table 32 stores, in each entry for a node 10, a node number, a total capacity, a free space, a performance index, and a CPU load factor.

The node number is a number identifying a node 10. The total capacity is the maximum capacity of data stored in the node 10. The free space is the capacity of an area left for storage of data. The performance index is a value representing the performance with which the node 10 processes data. The CPU load factor is a value representing the load condition of the CPU 13. Note that each node 10 performs polling at regular intervals of, for example, one minute to notify other nodes of the free space and the CPU load factor by which the free space and the CPU load factor are shared among all the nodes 10.

For example, in the node 10 whose number is "1", the maximum capacity of data stored is "100 TB", the capacity of an area left for storing data is "50 TB", the value representing the processing performance is "2", and the load condition of the CPU 13 is "20%".

Figure 5:
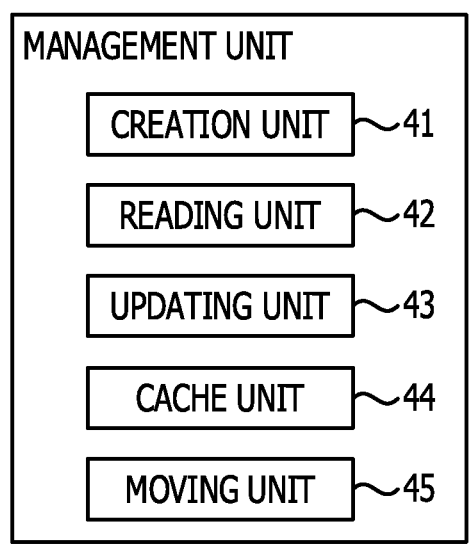
FIG. 5 is a diagram illustrating a functional configuration of a management unit.

Next, the function of the management unit implemented by executing the management program 40 will be described. FIG. 5 is a diagram illustrating a functional configuration of a management unit. As illustrated in FIG. 5, the management unit includes a creation unit 41, a reading unit 42, an updating unit 43, a cache unit 44, and a moving unit 45.

The creation unit 41 creates a directory or file, based on a request from the client 20. Note that the client 20 may transmit an access request to access the storage system 1 to an arbitrary node 10.

The creation unit 41 traces the namespace branch 21a to a directory at the lowest level, and lists the nodes 10 each of which owns a branch including a directory or file to be created, as target node candidates. If the traced directory is not a parent of the directory or file to be created and the number of target node candidates is larger than a certain number, the creation unit 41 further traces the namespace branch 21a in one of the target node candidates to a directory at the lowest level, and lists target node candidates. If, the traced directory is a parent of the directory or file to be created or the number of target node candidates is equal to or less than the certain number, the creation unit 41 selects a target node 10 from among the target node candidates on the basis of the free spaces and the CPU load factors of the target node candidates.

Then, the creation unit 41 of the target node 10 creates a directory or file to be created. Note that if the target node 10 does not own directories to be traced until the directory or file to be created is reached, the creation unit 41 also creates the directories. Then, the creation unit 41 of the target node 10 instructs other listed target node candidates to update ownership information. The node 10 that has received the request from the client 20 provides a completion response to the client 20 upon receiving, from all the target node candidates, responses indicating that processing has been completed.

When selecting the target node 10 from among target node candidates, the creation unit 41 determines whether there is a target node candidate whose free space is equal to or larger than a certain value. If there is such a target node candidate, the creation unit 41 selects a node 10 with a load less than a certain value, as the target node 10. If, however, there is no node 10 with a load less than the certain value, the creation unit 41 selects a least loaded node 10, as the target node 10. If there is no target node candidate whose free space is equal to or larger than the certain value, the creation unit 41 selects a node 10 whose free space is largest, as the target node 10. The certain value of the free space is, for example, 30%, and the certain value of the load is, for example, 50%.

Based on a request from the client 20, the reading unit 42 reads information on a directory, or a file, and sends the read information or the file to the client 20. In particular, the reading unit 42 traces the namespace branch 21a to a directory at the lowest level. If an object to be read is owned, the reading unit 42 reads information on the directory, or the file, and transmits it to the client 20.

If, however, the object to be read is not owned, the reading unit 42 instructs a node 10 that owns a branch including the object to be read to check whether information on the object to be read is owned. Note that a plurality of nodes 10 may be given instructions for the checking in some cases. The reading unit 42 of the node 10, which is given the instruction for the checking, checks whether the object to be read is owned. If the object to be read is owned, the reading unit 42 transmits information on the object to be read to the node 10 that has issued the instruction for the checking, and this node 10 that has issued the instruction for the checking transmits the information to the client 20.

The updating unit 43 updates a file in accordance with a request from the client 20. In particular, the updating unit 43 traces the namespace branch 21a to a directory at the lowest level. If an object to be updated is owned, the updating unit 43 updates a file and gives the client 20 a response indicating that updating has been completed.

If, however, the object to be updated is not owned, the updating unit 43 instructs a node 10 that owns a branch including the object to be updated to check whether a file as the object to be updated is owned. Note that a plurality of nodes 10 may be given instructions for the checking in some cases. Then, the updating unit 43 of the node 10, which is given the instruction for the checking, checks whether then object to be updated is owned. If the object to be updated is owned, the updating unit 43 updates the file and transmits a response indicating completion of updating to the node 10 that has issued the instruction for the checking. Then, the node 10 that has issued the instruction for the checking gives the client 20 a response indicating that updating has been completed.

The cache unit 44 caches directory information, which is a part of the namespace tree 21. A directory may contain information on another node 10 that owns a file that is not owned by the node 10 including the cache unit 44. If all the nodes 10 even at the lowest levels include caches, penalties increase due to cache updates for write processing. Accordingly, the cache unit 44 takes statistics on the frequencies of read and write processing for every directory hierarchy, and automatically adjusts directory hierarchy levels included in each node 10 so that the performance is optimized.

In a completely read only environment, every node 10 will have information on a complete tree structure of a file system. In contrast, in a completely write only environment, every node 10 will have only information on a tree structure of a file system owned by that node 10.

Figure 6:
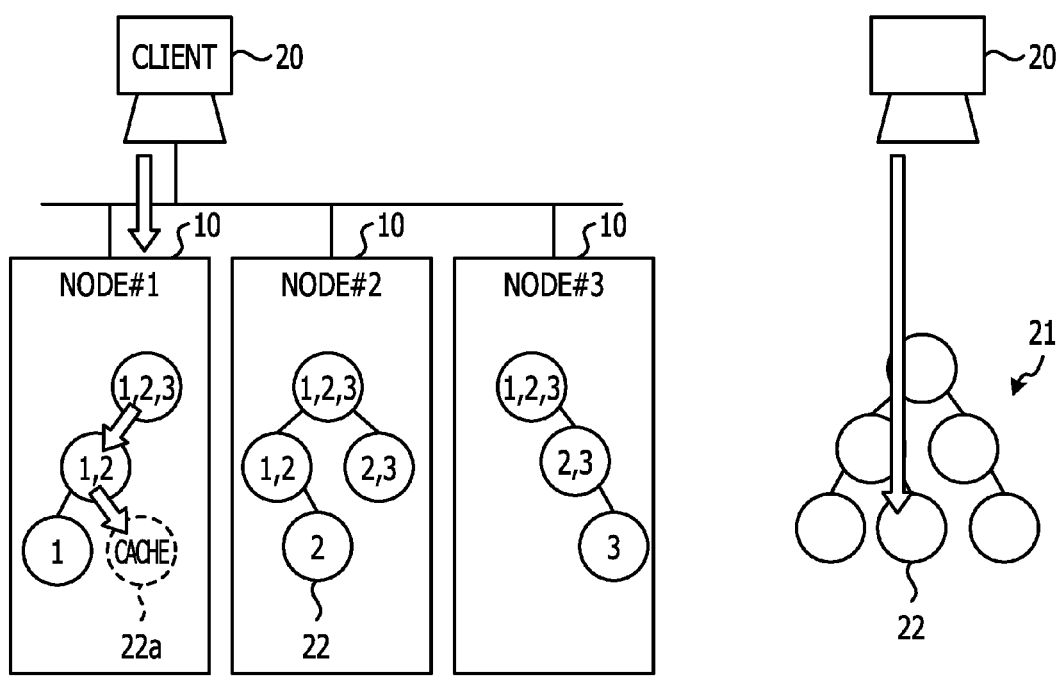
FIG. 6 is a diagram for explaining cache of directory information.

FIG. 6 is a diagram for explaining cache of directory information. In FIG. 6, although the information on the file 22 is owned by the node#2, a cache 22a is also stored in the node#1.

Figure 7:
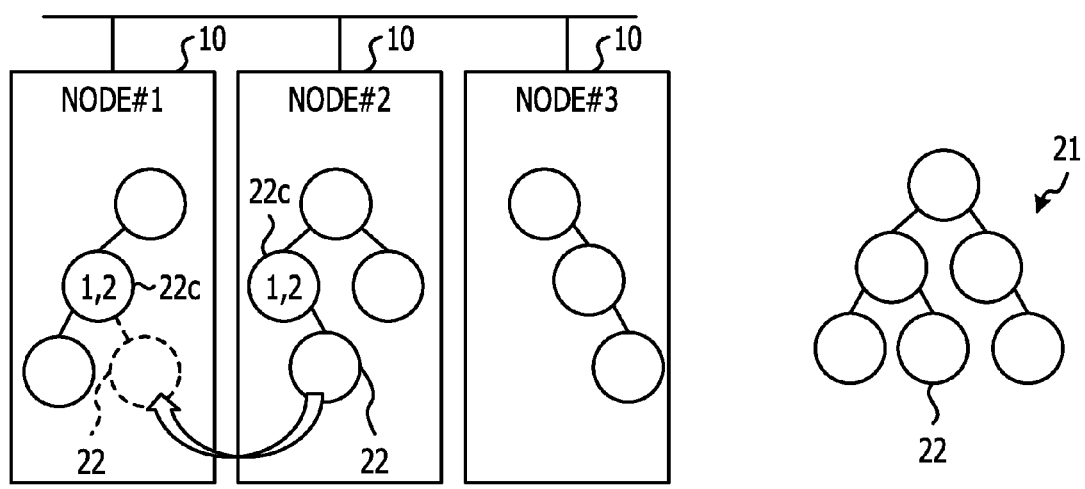
FIG. 7 is a diagram for explaining movement of a file between nodes.

The moving unit 45 performs movement of a file between the nodes 10 based on the namespace branch 21a as background processing to keep loads in balance among the nodes 10. FIG. 7 is a diagram for explaining movement of a file between the nodes 10.

In FIG. 7, in a situation in which the node#2 is highly loaded, or the free space is small, the file 22 owned by the node#2 is moved to the node#1. The nodes 10 that each own a parent directory 22c of the file 22 are the node#1 and the node#2. Accordingly, when moving the file 22, the moving unit 45 selects the node#1, which owns the parent directory 22c, as the movement destination. Selecting the node#1 that owns the parent directory 22c enables the moving unit 45 to move the file 22 with ease as compared with the case where the moving unit 45 selects the node#3 that does not own the parent directory 22c.

Figure 8:
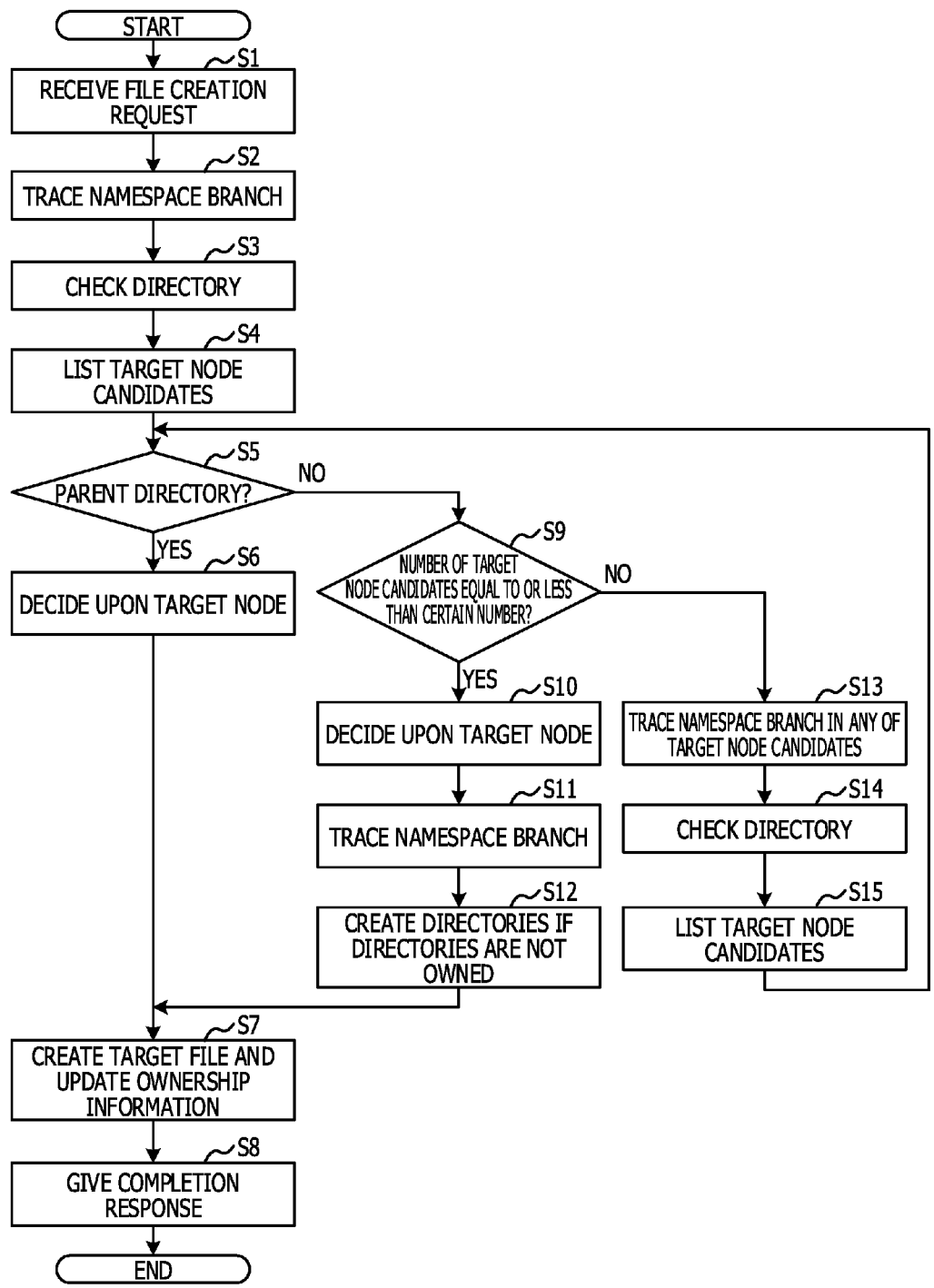
FIG. 8 is a flowchart illustrating the flow of a file creation process.

Next, the flow of a file creation process will be described. FIG. 8 is a flowchart illustrating the flow of the file creation process. Note that the flow of the process of creating a directory is obtained by replacing the "file creation request" with a "directory creation request" and the "target file" with a "target directory" in FIG. 8.

As illustrated in FIG. 8, upon receipt of a file creation request from the client 20 (S1), the creation unit 41 traces the namespace branch 21a along the path of a target file within the node 10 including the creation unit 41 (S2). Then, the creation unit 41 checks a directory at the lowest level at which the creation unit 41 has arrived (S3), and lists the nodes 10 that each own a branch including the target file, as target node candidates (S4).

Then, the creation unit 41 determines whether the directory at the lowest level is a parent directory of the target file (S5). If so, the creation unit 41 refers to the free spaces and the CPU load factors of the target node candidates, and decides upon the target node 10 in which the target file is to be created (S6).

Then, the creation unit 41 of the target node 10 creates the target file, and target node candidates except for the target node 10 update ownership information (S7). Upon receiving completion responses from all the target node candidates, the node 10 that has received the file creation request from the client 20 gives a completion response to the client 20 (S8).

If, however, the directory at the lowest level is not a parent directory of the target file, the creation unit 41 determines whether the number of target node candidates is equal to or less than a certain number (S9). If the number of target node candidates is equal to or less than the certain number, the creation unit 41 refers to the free spaces and the CPU load factors of the target node candidates, and decides upon the target node 10 in which the target file is to be created (S10).

Then, the creation unit 41 traces the namespace branch 21a along the path of the target file within the target node 10 (S11). If the target node 10 does not own directories to be traced as far as the target file, the creation unit 41 creates directories to be traced as far as the target file (S12), and proceeds to S7.

If, however, the number of target node candidates is not equal to or less than the certain number, the creation unit 41 traces the namespace branch 21a along the path of the target file in any of the target node candidates (S13). Then, the creation unit 41 checks a directory at the lowest level at which the creation unit 41 has arrived (S14), and lists the nodes 10 that each own a branch including the target file, as target node candidates (S15). Then, the creation unit 41 returns to S5.

In this way, by tracing the namespace branch 21a, the creation unit 41 decides upon the node 10 in which the target file is to be created. The node 10 in which the target file is to be created may therefore be efficiently decided upon.

Figure 9:
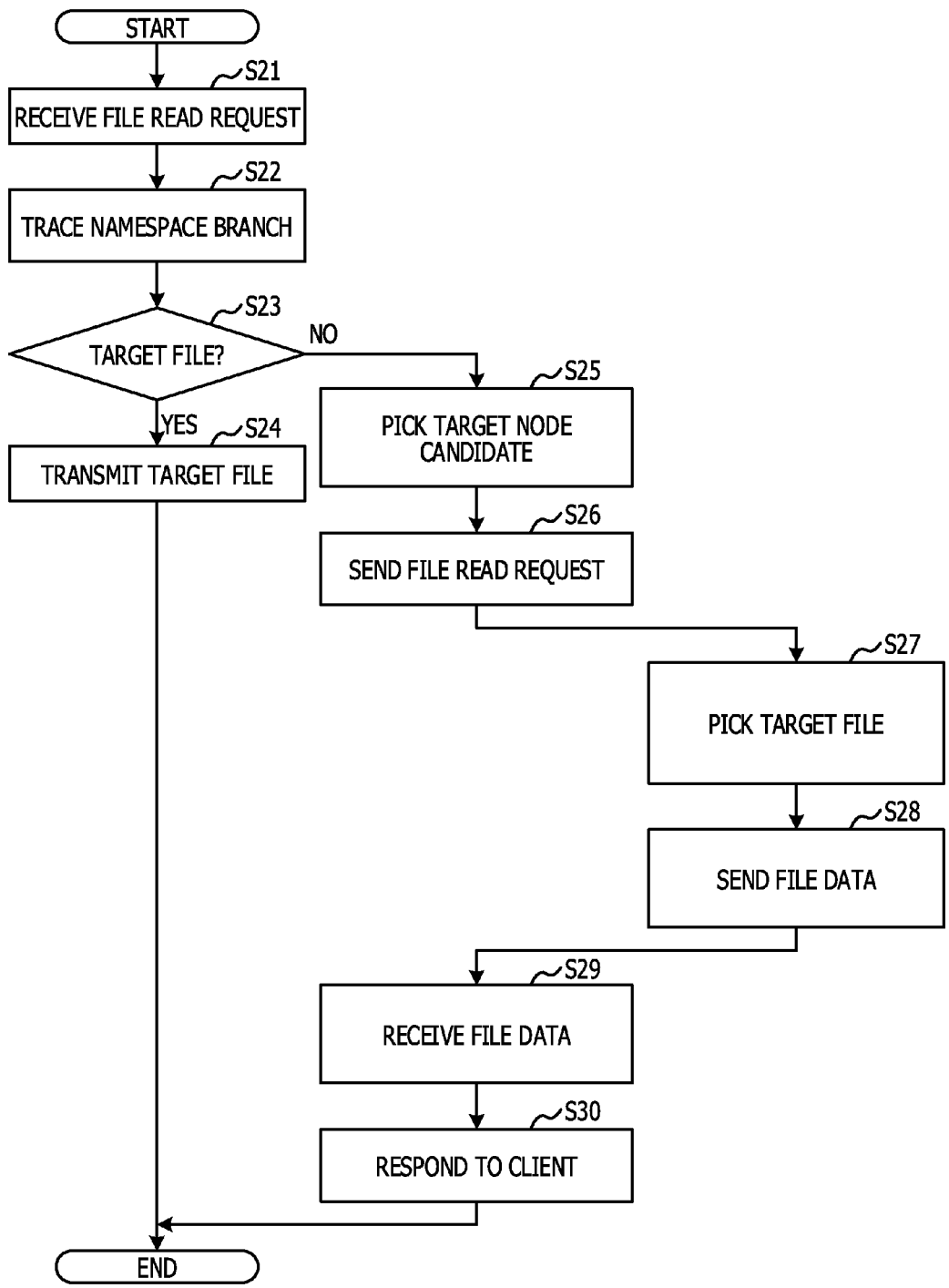
FIG. 9 is a flowchart illustrating the flow of a file reading process.

Next, the flow of a file reading process will be described. FIG. 9 is a flowchart illustrating the flow of the file reading process. Note that the flow of the process of reading a directory is obtained by replacing the "file read request" with a "directory read request", the "target file" with a "target directory", and the "file data" with "directory information" in FIG. 9.

As illustrated in FIG. 9, upon receipt of a file read request from the client 20 (S21), the reading unit 42 traces the namespace branch 21a along the path of a target file within the node 10 including the reading unit 42 (S22). Then, the reading unit 42 determines whether the reading unit 42 has arrived at the target file (S23). If the reading unit 42 has arrived at the target file, the reading unit 42 transmits the target file to the client 20 (S24).

If, however, the reading unit 42 has not arrived at the target file, the reading unit 42 picks a target node candidate that owns the target file, based on the last directory information at which the reading unit 42 has arrived (S25). Then, the reading unit 42 sends, to the target node candidate, a file read request in and below the directory at which the reading unit 42 has arrived (S26).

Then, the reading unit 42 of the node 10 that has received the file read request traces the namespace branch 21a in and below the received directory, and picks the target file (S27). Then, the reading unit 42 of the node 10 that owns the target file sends file data to the node 10 as the request source (S28).

Then, the reading unit 42 of the node 10 that has received the file read request from the client 20 receives file data from the node 10 that owns the target file (S29), and transmits the target file to the client 20 (S30).

In this way, by tracing the namespace branch 21a, the reading unit 42 identifies the node 10 that owns the target file. The node 10 that owns the target file may therefore be efficiently identified.

Figure 10:
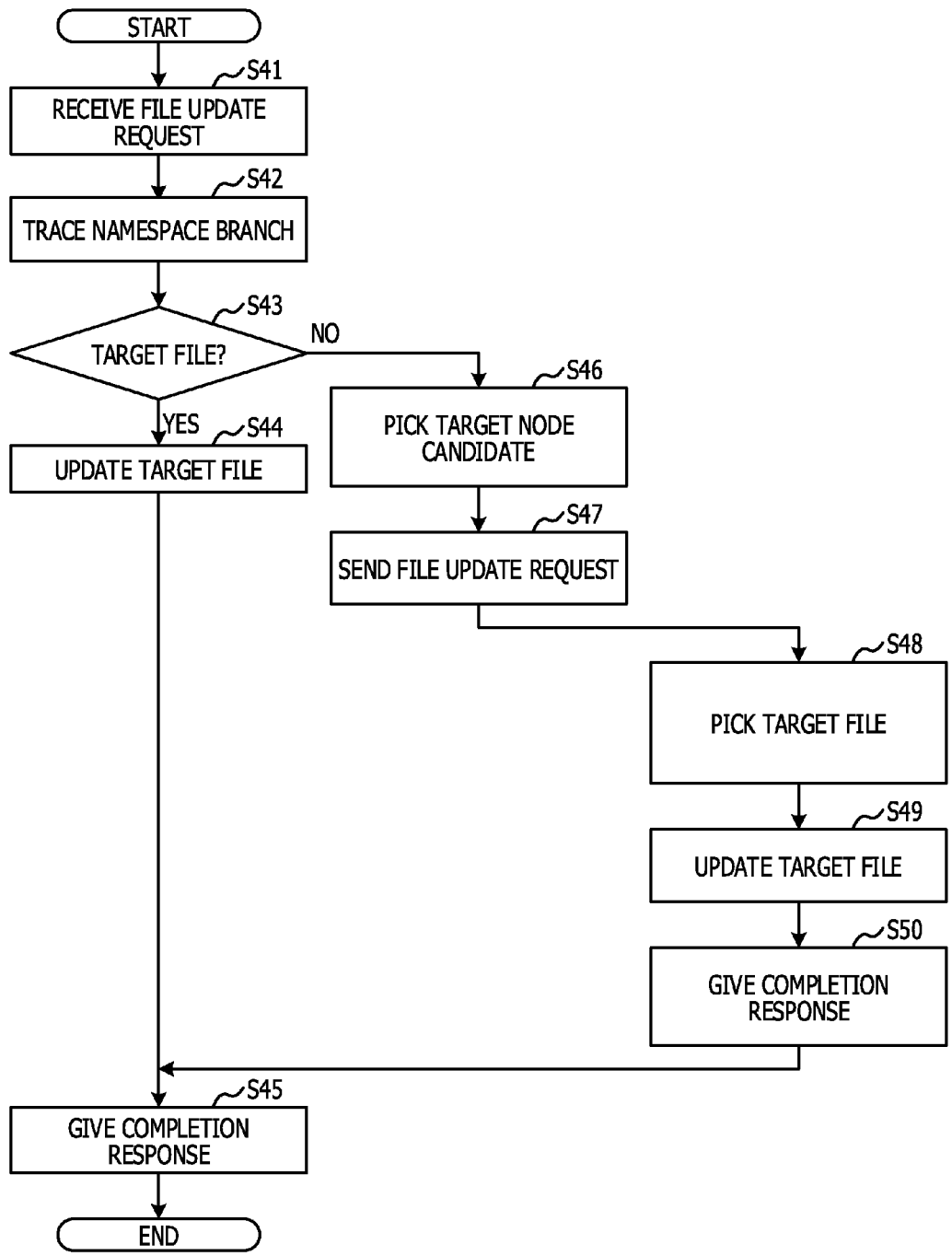
FIG. 10 is a flowchart illustrating the flow of a file update process.

Next, the flow of a file update process will be described. FIG. 10 is a flowchart illustrating the flow of the file update process. As illustrated in FIG. 10, upon receipt of a file update request from the client 20 (S41), the updating unit 43 traces the namespace branch 21a along the path of a target file within the node 10 including the updating unit 43 (S42). Then, the updating unit 43 determines whether the updating unit 43 has arrived at the target file (S43). If the updating unit 43 has arrived at the target file, the updating unit 43 updates the target file (S44), and gives a completion response to the client 20 (S45).

If, however, the updating unit 43 has not arrived at the target file, the updating unit 43 picks a target node candidate that owns the target file, based on the last directory information at which the updating unit 43 has arrived (S46). Then, the updating unit 43 sends, to the target node candidate, a file update request in and below the directory at which the updating unit 43 has arrived (S47).

Then, the updating unit 43 of the node 10 that has received the file update request traces the namespace branch 21a in and below the received directory, and picks the target file (S48). Then, the updating unit 43 of the node 10 that owns the target file updates the target file (S49), and gives a completion response to the node 10 as the request source (S50).

Then, the updating unit 43 of the node 10, which has received the file update request from the client 20, receives the completion response from the node 10 that owns the target file, and gives a completion response to the client 20 (S45).

In this way, by tracing the namespace branch 21a, the updating unit 43 identifies the node 10 that owns the target file. The node 10 that owns the target file may therefore be efficiently identified.

As described above, in the embodiment, the node 10 has information on the namespace branch 21a, which is a part of the namespace tree 21. The node 10 stores, in the namespace branch 21a, numbers identifying the nodes 10 that store information on a directory or file in association with the directory or file. When the node 10 does not own a target directory or file of an access request, the node 10 transmits an access request to the node 10 of a number associated with the directory in the namespace branch 21a. Accordingly, when the node 10 does not own a target directory or file of an access request, the node 10 does not have to make an inquiry to a namespace container NS about the storage node of the file. This may reduce an overhead entailed in that inquiry.

In the foregoing embodiment, the example in which movement of a file between the nodes 10 based on the namespace branch 21a is performed as background processing has been described. However, movement of a file may be performed at the time of file updating. The case where a file is moved at the time of file updating will be described.

Figure 11:
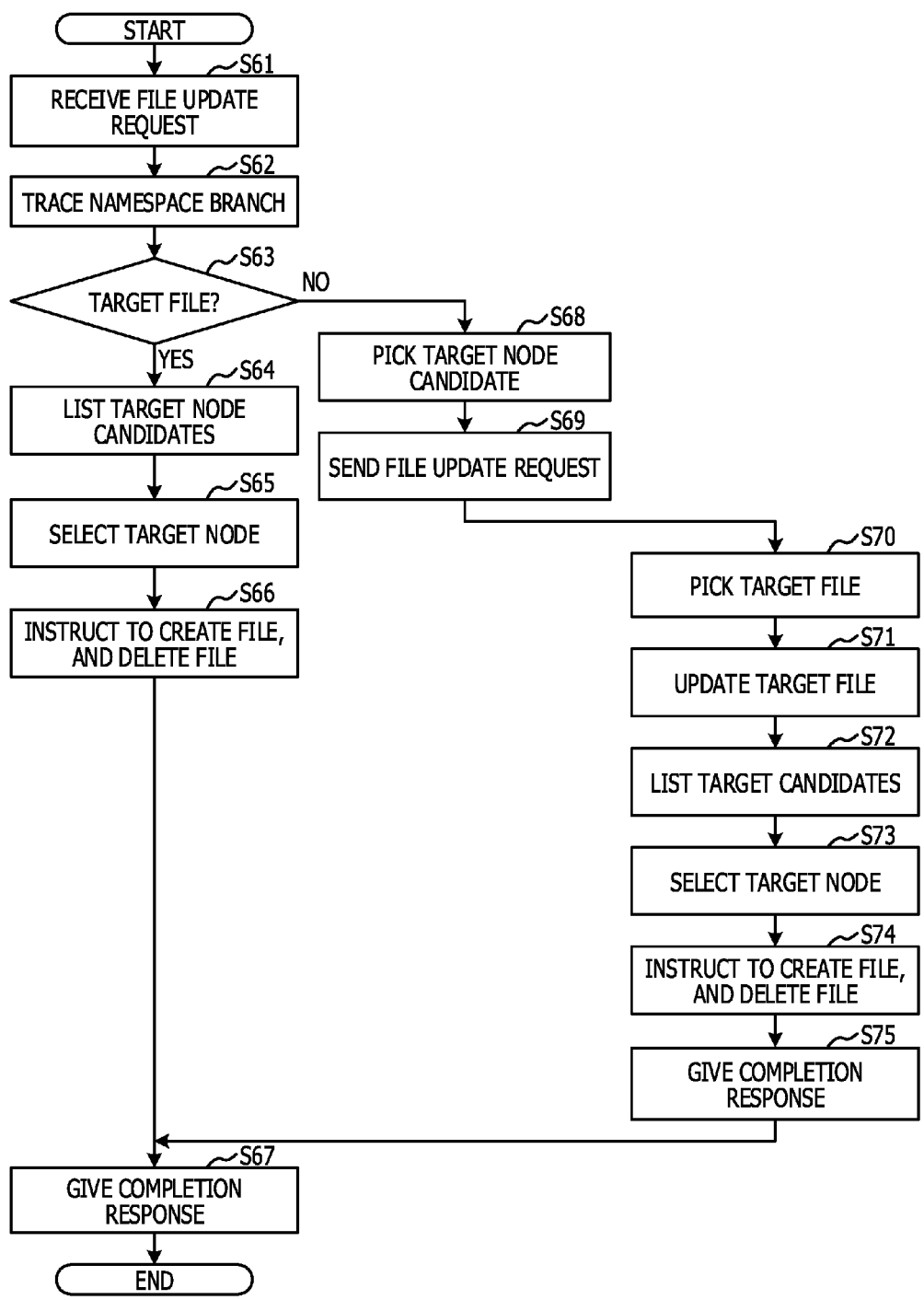
FIG. 11 is a flowchart illustrating the flow of a file update process accompanied by movement of a file.

FIG. 11 is a flowchart illustrating the flow of a file update process accompanied by movement of a file. As illustrated in FIG. 11, upon receipt of a file update request from the client 20 (S61), the updating unit 43 traces the namespace branch 21a along the path of a target file within the node 10 including the updating unit 43 (S62).

Then, the updating unit 43 determines whether the updating unit 43 has arrived at the target file (S63). If the updating unit 43 has arrived at the target file, the updating unit 43 lists the nodes 10 that each have a parent directory of the target file, as target node candidates (S64). Then, the updating unit 43 selects a target node 10 from among the target node candidates on the basis of their free spaces and CPU load factors (S65). Then, the updating unit 43 instructs the target node 10 to create a file and deletes the file within the node 10 including the updating unit 43 (S66). Then, the updating unit 43 gives a completion response to the client 20 (S67).

If, however, the updating unit 43 has not arrived at the target file, the updating unit 43 picks a target node candidate that owns the target file, based on the last directory information at which the updating unit 43 has arrived (S68). Then, the updating unit 43 sends, to the target node candidate, a file update request in and below the directory at which the updating unit 43 has arrived (S69).

Then, the updating unit 43 of the node 10 that has received the file update request traces the namespace branch 21a in and below the received directory, and picks the target file (S70). Then, the updating unit 43 of the node 10 that owns the target file updates the target file (S71), and lists the nodes 10 that each have a parent directory of the target file, as target node candidates (S72).

Then, the updating unit 43 of the node 10 that owns the target file selects a target node 10 from among the target node candidates on the basis of the free spaces and the CPU load factors (S73). Then, the updating unit 43 of the node 10 that owns the target file instructs the target node 10 to create a file and deletes the file within the node 10 including the updating unit 43 (S74). Then, the updating unit 43 of the node 10 that owns the target file gives a completion response to the node 10 as the request source (S75). The node 10 as the request source gives a completion response to the client 20 (S67).

In this way, when updating a file, the updating unit 43 selects the target node 10 on the basis of the free spaces and the CPU load factors, instructs the target node 10 to create a file, and deletes a file within the node 10 in which this updating unit 43 is included. Thus, it is possible to keep loads in balance among the nodes 10.

Although, in the foregoing embodiment, the case where a specific node 10 possesses a file has been described, providing co-owned node information to a file enables the file to be shared by a plurality of nodes 10. In accordance with the management program 40, the node 10 that has received a request from the client 20 may select a plurality of logically close or less loaded nodes 10, and send a request in a distribution manner to the plurality of nodes 10. Thus, the performance of sequential access may be improved owing to spanning. Co-owning a file among a plurality of nodes 10 may increase redundancy for a specific file or for each namespace branch 21*a*. The node 10 that has received a request from the client 20 may redundantly encode a file to stripe the file across a plurality of nodes 10. This may improve sequential access performance and secure redundancy.

Figure 12:
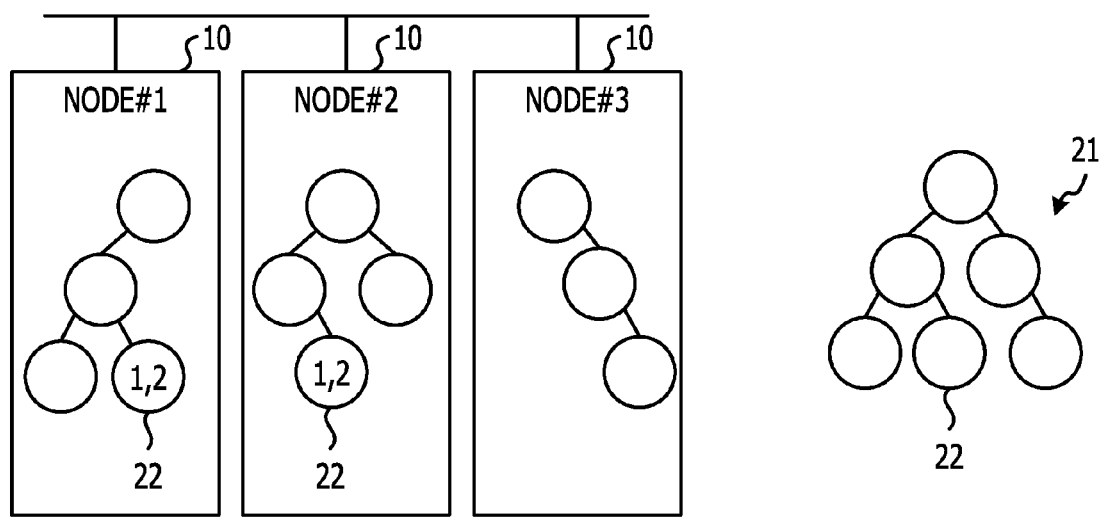
FIG. 12 is a diagram for explaining co-owning of a file by a plurality of nodes.
Figure 13:
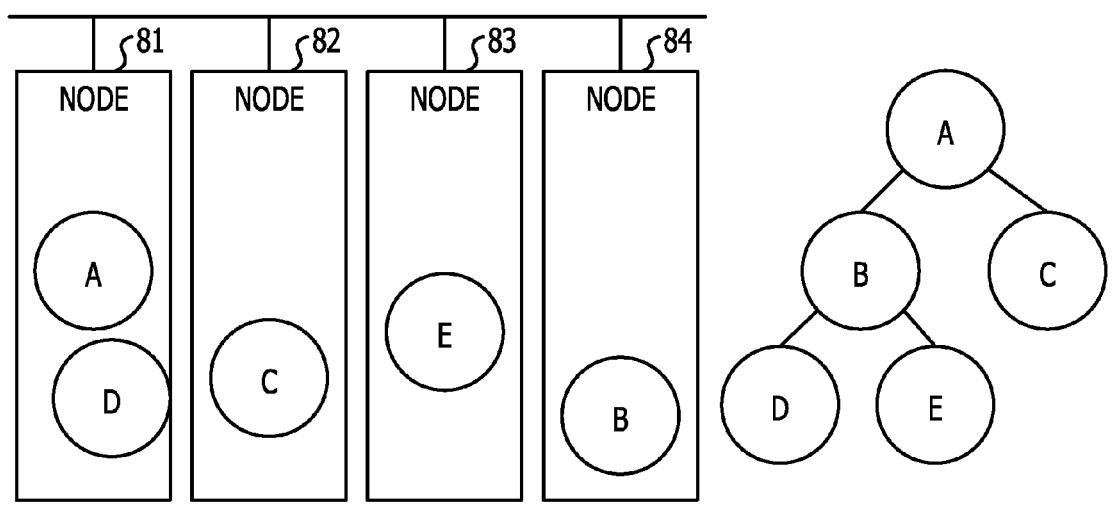
FIG. 13 is a diagram for explaining implementation employing internal mounts of a plurality of volumes by using junctions.
Figure 14:
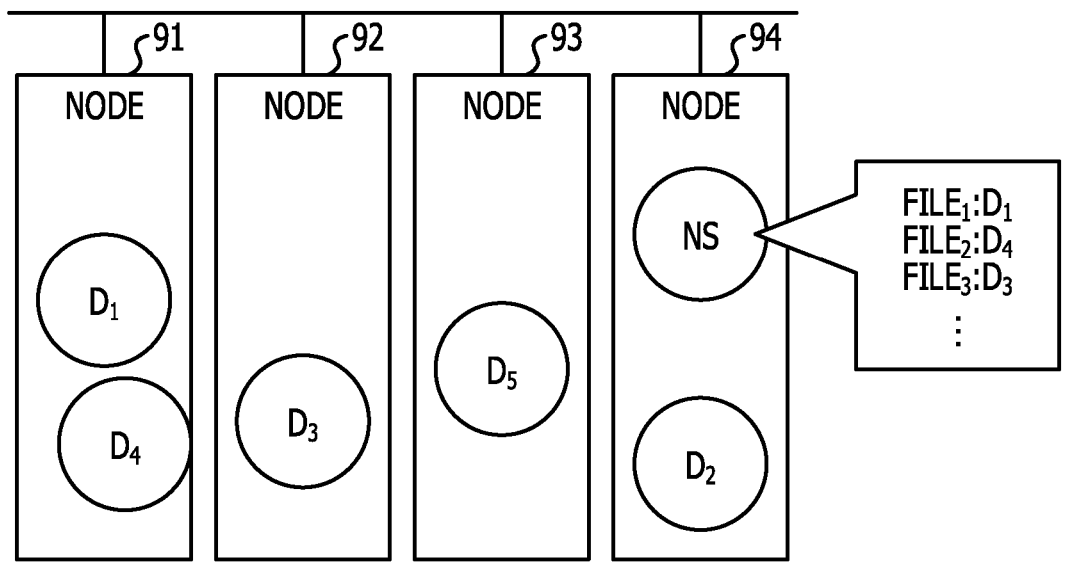
FIG. 14 is a diagram for explaining implementation using a single namespace container.

FIG. 12 is a diagram for explaining co-owning of a file among a plurality of nodes 10. FIG. 12 illustrates the case where the file 22 is co-owned by the node#1 and the node#2. In the node#1 and the node#2, node numbers "1" and "2" are associated with the file 22.

In the embodiment, the case where hierarchical structure information of the namespace tree 21 and information on the owing nodes 10 are stored using a plurality of i-node tables 31*a* has been described. However, embodiments are not limited to this, and may be similarly applied to the case where the hierarchical structure information of the namespace tree 21 and the information on the owing nodes 10 are separately stored.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage device of constituent storage devices included in a storage system, the storage device comprising:
 a first storage configured to store therein a part of a data group stored in the storage system;
 a second storage configured to store therein partial hierarchical information which is a part of information on a hierarchical structure of the data group;
 a third storage configured to store therein owner information including a data identifier in association with a device identifier, the data identifier identifying a specific data included in the data group, the specific data being related to the partial hierarchical information, the device identifier identifying a specific device of the constituent storage devices, the specific device storing therein the specific data; and
 a processor configured to
  share management of the data group with other devices of the constituent storage devices based on the partial hierarchical information and the owner information;
  upon receiving a request for access to first data from a client device, trace the partial hierarchical information along a path to a target file;
  determine whether the specific data arrives at the target file based on the tracing;
  when it is determined the specific data arrives at the target file, determine the first data is stored in the storage device; and
  when it is determined the specific data does not arrive at the target file, determine the first data is stored at one of the other devices of the constituent storage devices.

2. The storage device according to claim 1, wherein the processor is configured to
 determine, upon receiving a request for access to first data from a client device, whether the first data is stored in the storage device based on the partial hierarchical information, and
 identify, if it is determined that the first data is not stored in the storage device, a first device that stores therein the first data from among the other devices based on the owner information to transfer the request to the first device.

3. The storage device according to claim 2, wherein the processor is configured to
 identify, upon receiving a request for creation of second data from the client device, a second device that stores a directory serving as a parent of the second data from among the other devices based on the partial hierarchical information and the owner information to create the second data in the second device.

4. The storage device according to claim 2, wherein the processor is configured to
 store first information in a cache, the first information including partial hierarchical information and owner information both stored in a second device of the other devices, the first information being related to second data created by the second device.

5. The storage device according to claim 2, wherein the processor is configured to
 identify, when migrating second data stored in the storage device, a second device that stores a directory serving as a parent of the second data from among the other devices based on the partial hierarchical information and the owner information to move the second data to the second device.

6. The storage device according to claim 2, wherein the processor is configured to
 select, upon receiving a request for creation of second data from the client device, a plurality of devices from among the other devices to dispersedly store the second data in the selected devices.

7. The storage device according to claim 2, wherein the partial hierarchical information and the owner information are managed in form of a plurality of tables.

8. A storage system, comprising:
 a plurality of storage devices each including:
 a first storage unit configured to store therein a part of a data group stored in the storage system;
 a second storage unit configured to store therein partial hierarchical information which is a part of information on a hierarchical structure of the data group;
 a third storage unit configured to store therein owner information including a data identifier in association with a device identifier, the data identifier identifying a specific data included in the data group, the specific data being related to the partial hierarchical information, the device identifier identifying a specific device of the storage devices, the specific device storing therein the specific data; and a processor configured to
- share management of the data group with other devices of the storage devices based on the partial hierarchical information and the owner information;
- upon receiving a request for access to first data from a client device, trace the partial hierarchical information along a path to a target file;
- determine whether the specific data arrives at the target file based on the tracing;
- when it is determined the specific data arrives at the target file, determine the first data is stored in the storage device; and
- when it is determined the specific data does not arrive at the target file, determine the first data is stored at one of the other devices of the constituent storage.

9. A non-transitory computer-readable recording medium having stored therein a program for causing a computer to execute a process, the computer being one of storage devices included in a storage system, the process comprising:

storing, in a first storage unit, a part of a data group stored in the storage system;

storing, in a second storage unit, partial hierarchical information which is a part of information on a hierarchical structure of the data group;

storing, in a third storage unit, owner information including a data identifier in association with a device identifier, the data identifier identifying a specific data included in the data group, the specific data being related to the partial hierarchical information, the device identifier identifying a specific device of the storage devices, the specific device storing therein the specific data;

sharing management of the data group with other devices of the storage devices based on the partial hierarchical information and the owner information;

upon receiving a request for access to first data from a client device, tracing the partial hierarchical information along a path to a target file;

determining whether the specific data arrives at the target file based on the tracing;

when it is determined the specific data arrives at the target file, determining the first data is stored in the storage device; and when it is determined the specific data does not arrive at the target file, determining the first data is stored at one of the other devices of the constituent storage devices.

* * * * *